(12) United States Patent
Sanchez-Monge et al.

(10) Patent No.: US 11,100,618 B2
(45) Date of Patent: Aug. 24, 2021

(54) SYSTEMS AND METHODS FOR REDUCING LOW-FREQUENCY NON-UNIFORMITY IN IMAGES

(71) Applicant: FLIR Systems, Inc., Wilsonville, OR (US)

(72) Inventors: Enrique Sanchez-Monge, Tampere (FI); Alessandro Foi, Tampere (FI)

(73) Assignee: FLIR Systems, Inc., Wilsonville, OR (US)

(*) Notice: Subject to any disclaimer, the term of this patent is extended or adjusted under 35 U.S.C. 154(b) by 82 days.

(21) Appl. No.: 16/568,139

(22) Filed: Sep. 11, 2019

(65) Prior Publication Data

US 2020/0005440 A1 Jan. 2, 2020

Related U.S. Application Data

(63) Continuation of application No. PCT/US2018/022495, filed on Mar. 14, 2018.
(Continued)

(51) Int. Cl.
*G06T 5/00* (2006.01)
*G06T 3/40* (2006.01)
*G06T 5/10* (2006.01)

(52) U.S. Cl.
CPC ............. *G06T 5/008* (2013.01); *G06T 3/40* (2013.01); *G06T 5/003* (2013.01); *G06T 5/10* (2013.01); *G06T 2207/10048* (2013.01)

(58) Field of Classification Search
CPC .......... G06T 2207/10016; G06T 2207/10048; G06T 2207/20182; G06T 5/002;
(Continued)

(56) References Cited

U.S. PATENT DOCUMENTS 7,782,378 B2 * 8/2010 Zhang ..................... G06T 5/002
348/241
8,294,781 B2 * 10/2012 Cote .................... H04N 5/3572
348/222.1
(Continued)

OTHER PUBLICATIONS

Azzabou et al., "Non-Uniformity Correction Using Cosine Functions Basis and Total Variation Constraint", Biomedical Imaging: From Nano to Macro, Apr. 14, 2010, pp. 748-751. IEEE.
(Continued)

*Primary Examiner* — Ian L Lemieux
(74) *Attorney, Agent, or Firm* — Haynes and Boone, LLP

(57) ABSTRACT

Various techniques are disclosed for separating and removing low-frequency shadow or shading (also referred to herein as "non-uniformity") from images that have been corrupted by the non-uniformity. A non-uniformity estimate that approximates the non-uniformity effect on the corrupted image may be generated by iteratively adding new blotches of non-uniformity data represented by two-dimensional (2D) functions, such as 2D Gaussian functions, to the non-uniformity estimate and applying filters to smoothen the 2D functions. In each iteration of the non-uniformity estimate generation process, a new non-uniformity update candidate that minimizes a cost function is identified. The corrupted image is processed based on the non-uniformity estimate to generate a corrected image.

20 Claims, 11 Drawing Sheets

Related U.S. Application Data

(60) Provisional application No. 62/471,854, filed on Mar. 15, 2017.

(58) Field of Classification Search
CPC .......... H04N 5/21; H04N 5/217; H04N 5/33; H04N 2209/046; H04N 5/208; H04N 5/3572; H04N 5/361; H04N 5/367; H04N 5/3675; H04N 9/045; H04N 9/04515
See application file for complete search history.

(56) References Cited

U.S. PATENT DOCUMENTS

| | | | | |
|---|---|---|---|---|
| 8,331,714 | B2* | 12/2012 | Van Beek | G06T 5/003 |
| | | | | 382/255 |
| 10,733,419 | B2* | 8/2020 | Lee | G06T 7/13 |
| 2007/0047838 | A1* | 3/2007 | Milanfar | G06K 9/40 |
| | | | | 382/289 |
| 2008/0278607 | A1* | 11/2008 | Zhang | G06T 5/002 |
| | | | | 348/241 |
| 2008/0292163 | A1* | 11/2008 | DiBella | G01R 33/561 |
| | | | | 382/131 |
| 2008/0310695 | A1* | 12/2008 | Garnier | G06T 5/50 |
| | | | | 382/131 |
| 2009/0190814 | A1* | 7/2009 | Bouman | G06T 11/006 |
| | | | | 382/131 |
| 2010/0322534 | A1* | 12/2010 | Bolme | G06K 9/746 |
| | | | | 382/278 |
| 2011/0182501 | A1* | 7/2011 | Mercier | G06K 9/527 |
| | | | | 382/159 |
| 2013/0182968 | A1* | 7/2013 | Adams | G06T 5/002 |
| | | | | 382/264 |
| 2014/0015921 | A1* | 1/2014 | Foi | H04N 5/21 |
| | | | | 348/42 |
| 2019/0197740 | A1* | 6/2019 | Lu | G06T 11/005 |

OTHER PUBLICATIONS

Chen et al., "Estimation of Image Bias Field by Diffusion", Optik—International Journal for Light and Electron Optics, Oct. 1, 2013, pp. 4590-4593, vol. 124, No. 20.

* cited by examiner

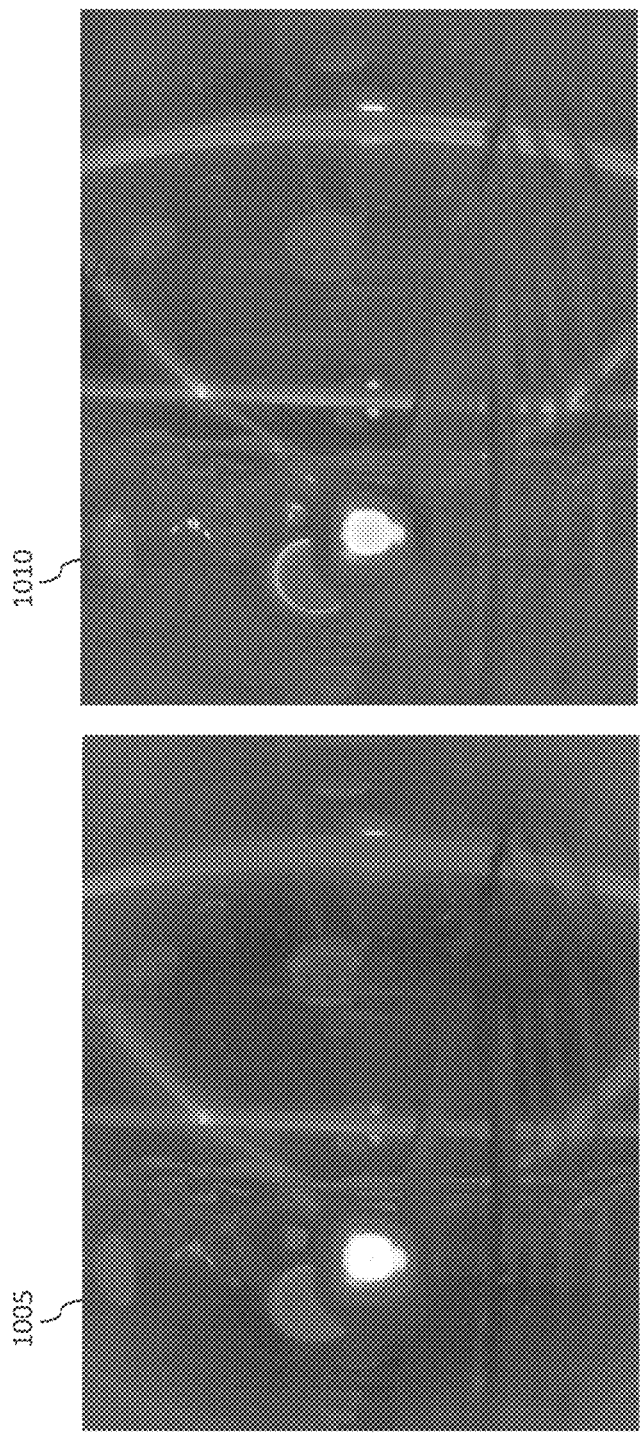

SYSTEMS AND METHODS FOR REDUCING LOW-FREQUENCY NON-UNIFORMITY IN IMAGES

CROSS REFERENCE TO RELATED APPLICATIONS

This application is a continuation of International Patent Application No. PCT/US2018/022495 filed Mar. 14, 2018 and entitled "SYSTEMS AND METHODS FOR REDUCING LOW-FREQUENCY NON-UNIFORMITY IN IMAGES," which is incorporated herein by reference in its entirety.

International Patent Application No. PCT/US2018/022495 filed Mar. 14, 2018 claims priority to and the benefit of U.S. Provisional Patent Application No. 62/471,854 filed Mar. 15, 2017 and entitled "SYSTEMS AND METHODS FOR REDUCING LOW FREQUENCY NON-UNIFORMITY IN IMAGES," which is hereby incorporated by reference in its entirety.

TECHNICAL FIELD

One or more embodiments of the invention relate generally to imaging processing and more particularly, for example, to separation of low frequency shading from images.

BACKGROUND

Images (e.g., infrared images, etc.) frequently have undesirable low-frequency shading (also referred to as "non-uniformity data" hereinafter) for a variety of reasons. For example, the shape, size, and position of the housing for an image capturing device relative to the lens of the image capturing device can often cause shading in the corners (e.g., vignette). When an infrared camera is disposed near a heat source, such as a heater, a car engine, the images produced by the infrared camera might have shading in an area that corresponds to the side of the sensor near the heat source. Additionally, some cameras might have imperfect gain correction that produces shading as a result. The low frequency shading often obscures the actual data of the image causing loss of perceptible details in the image.

Conventional scene-based non-uniformity correction methods are not ideal, as these methods are dependent on the scene. Specifically, these scene-based methods rely on global motion (e.g., motion of the camera) across multiple frames within a video clip to make the proper adjustments. In situations where the global motion of the camera is imperfect, artifacts such as burn-in may be introduced to the image using these scene-based methods. Furthermore, the scene-based methods are simply not suitable for fixed mount cameras (e.g., security cameras) or for situations where only partial frames are moving (e.g., camera fixed on a moving vehicle).

Thus, there is a need for improved non-uniformity correction techniques for reducing low-frequency shading.

SUMMARY

Various embodiments of the methods and systems disclosed herein may be used to separate and remove low-frequency shadow or shading (also referred to herein as "non-uniformity") from images that have been corrupted by the non-uniformity due to a variety of reasons. Such corrupted images may, for example, be captured by an imaging sensor or device that, due to its configuration or the environment in which it is operated, produces images that include low-frequency non-uniformity data mixed with data that represents an actual scene.

Systems and methods according to one or more embodiments of the disclosure can separate and remove the non-uniformity data (e.g., low-frequency non-uniformity or shading) from a corrupted image by generating a non-uniformity estimate that approximates the non-uniformity effect on the corrupted image, and processing the corrupted image to generate a corrected image based on the non-uniformity estimate. The non-uniformity estimate may be generated in various ways according to embodiments of the disclosure. Under an iterative approach, the non-uniformity estimate may be generated by iteratively adding new blotches (e.g., variations in pixel intensity in the shape of bumps, dimples, or other smooth transitions) of non-uniformity data represented by two-dimensional (2D) functions, such as 2D Gaussian functions, to the non-uniformity estimate and applying filters to smoothen the 2D functions. In each iteration of the non-uniformity estimate generation process, a new non-uniformity update candidate that minimizes a cost function is identified. The cost function takes into account a total variation among pixel values in the image and an energy level of the gradient of the non-uniformity update candidate. In some embodiments, the process updates the non-uniformity estimate with the non-uniformity update candidate only if the non-uniformity update candidate improves (e.g., reduces) the cost based on the cost function. The non-uniformity estimate is then applied to the corrupted image to generate a corrected image.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 10A and 10B illustrate another original image, and a corrected image obtained from applying a signal demixing process in accordance with an embodiment of the disclosure to correct the original image, respectively.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
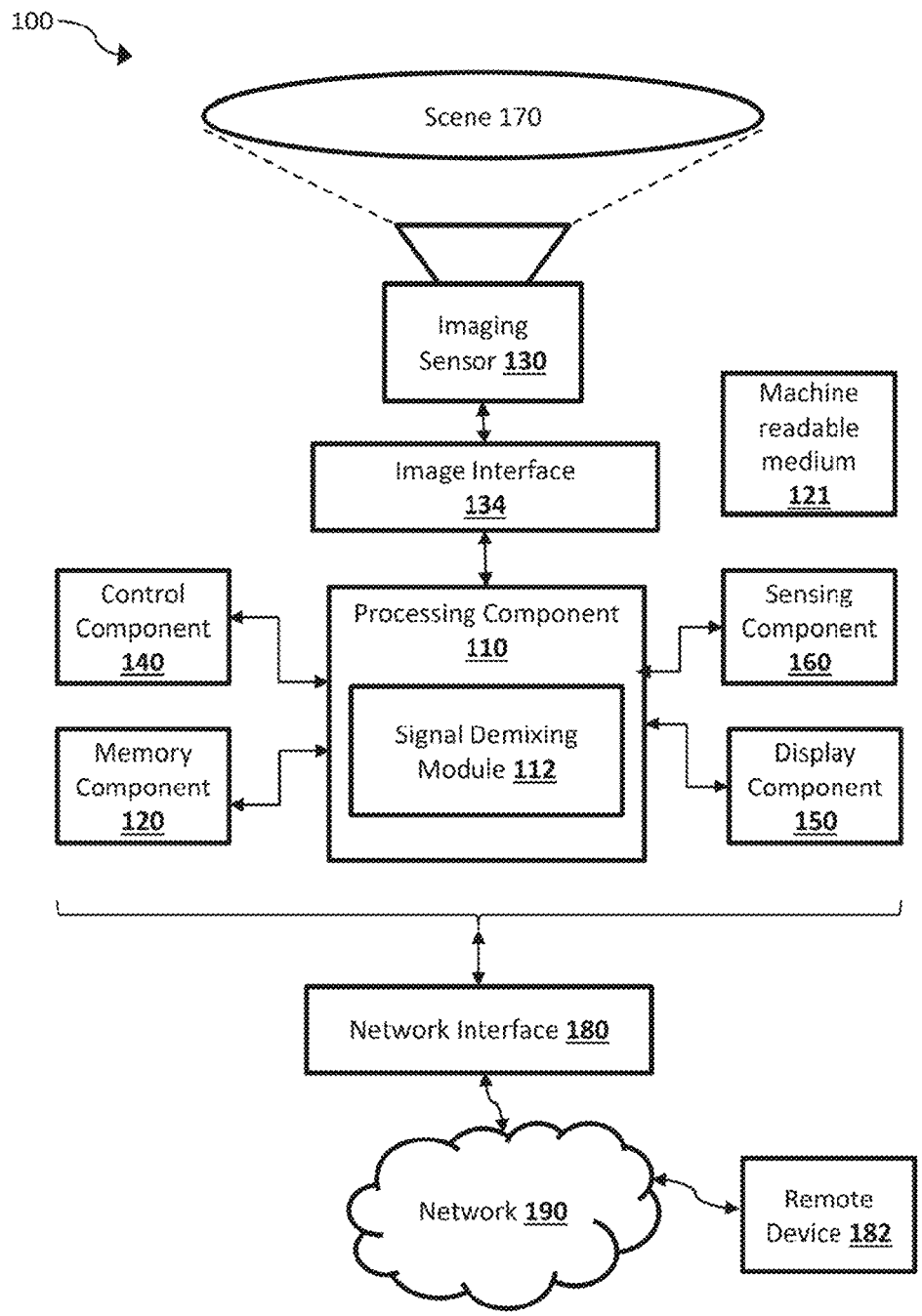
FIG. 1 illustrates a block diagram of an imaging system in accordance with an embodiment of the disclosure.

Various embodiments of the methods and systems disclosed herein may be used to separate and remove low-frequency shadow or shading (also referred to herein as "non-uniformity") from images that have been corrupted by the non-uniformity due to a variety of reasons. Such corrupted images may, for example, be captured by an imaging sensor or device that, due to its configuration or the environment in which it is operated, produces images that include low-frequency non-uniformity data mixed with data that represents an actual scene.

Systems and methods according to one or more embodiments of the disclosure can separate and remove the non-uniformity data (e.g., low-frequency non-uniformity or shading) from a corrupted image by generating a non-uniformity estimate that approximates the non-uniformity effect on the corrupted image, and processing the corrupted image to generate a corrected image based on the non-uniformity estimate. The non-uniformity estimate may be generated in various ways according to embodiments of the disclosure. Under an iterative approach, the non-uniformity estimate may be generated by iteratively adding new blotches (e.g., variations in pixel intensity in the shape of bumps, dimples, or other smooth transitions) of non-uniformity data represented by two-dimensional (2D) functions, such as 2D Gaussian function, to the non-uniformity estimate and applying filters to smoothen the 2D functions. In each iteration of the non-uniformity estimate generation process, a new non-uniformity update candidate that minimizes a cost function is identified. The cost function takes into account a total variation among pixel values in the image and an energy level of the gradient of the non-uniformity update candidate. In some embodiments, the process updates the non-uniformity estimate with the non-uniformity update candidate only if the non-uniformity update candidate improves (e.g., reduces) the cost based on the cost function. The non-uniformity estimate is then applied to the corrupted image to generate a corrected image.

In some embodiments, instead of a 2D Gaussian function (curve), other types of smooth 2D bump-like functions may be used as an update candidate. Such 2D bump-like functions (also may be referred to as 2D bump functions) may include 2D or bivariate functions that represent variations in values (e.g., pixel intensity) within predefined peak amplitudes and/or widths and in the shape of a bump or a dimple (depending on the sign of the peak amplitude).

The process of updating the non-uniformity estimate may be iteratively performed until either a pre-determined number of iterations are completed or a desired quality of non-uniformity estimate is achieved. One of the advantages of the non-uniformity data removal technique is that the non-uniformity estimation process may be performed outside of a main signal processing path that includes other video signal processing operations. That is, the non-uniformity estimation process may be performed as a background process. Once the non-uniformity estimate is generated, the non-uniformity estimate may then be applied to the subsequent video signals.

Turning now to FIG. 1, a block diagram is illustrated of a system 100 of some embodiments for capturing and processing images and videos (e.g., video frames) in accordance with an embodiment of the disclosure. System 100 comprises, according to one implementation, a processing component 110, a memory component 120, an imaging sensor 130, an image interface 134, a control component 140, a display component 150, a sensing component 160, and/or a network interface 180.

System 100 may represent an imaging device, such as a video and/or still camera, to capture and process images and/or videos of a scene 170. In this regard, the imaging sensor 130 of system 100 may be configured to capture images (e.g., still and/or video images) of scene 170 in a particular spectrum or modality. For example, in some embodiments, the imaging sensor 130 may include a complementary metal oxide semiconductor (CMOS) sensor or a charge-coupled device (CCD) sensor that can be found in any consumer camera. In some other embodiments, the imaging sensor 130 may include an IR imaging sensor configured to detect IR radiation in the near, middle, and/or far IR spectrum and provide IR images (e.g., IR image data or signal) representative of the IR radiation from scene 170. In one specific, not-limiting example, the imaging sensor 130 may comprise a thermal IR imaging sensor having a focal plane array (FPA) of detectors responsive to thermal IR radiation including short-wave IR (SWIR), mid-wave IR (MWIR), and/or long-wave IR (LWIR) radiation.

Other imaging sensors that may be embodied in the imaging sensor 130 include a PMD imaging sensor or other ToF imaging sensor, LIDAR imaging device, millimeter imaging device, PET scanner, SPECT scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the imaging sensor 130 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

System 100 may comprise a portable device and may be incorporated, for example, into a vehicle (e.g., an automobile or other type of land-based vehicle, an unmanned aerial vehicle (UAV), unmanned aircraft system (UAS), drone, or other type of aircraft or spacecraft) or a non-mobile installation requiring images to be stored and/or displayed.

Processing component 110, according to various embodiments, comprises one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. For example, processing component 110 may include a signal demixing module 112, which may represent any suitable combination of hardware components and software instructions, configured to perform various operations to remove undesirable shading (non-uniformity data) of images as further discussed herein. Processing component 110 is configured to interface and communicate with various other components of system 100 to perform such operations. In one aspect, processing component 110 according to some embodiments may be configured to perform various system control operations (e.g., to control communications and operations of various components of system 100) and other image processing operations (e.g., data conversion, video analytics, noise suppression), as part of or separate from the operations to remove non-uniformity data from images.

It should be appreciated that signal demixing module 112 may, in some embodiments, be integrated in software and/or hardware as part of processing component 110, with code (e.g., software instructions and/or configuration data) for signal demixing module 112 stored, for example, in memory component 120. In some embodiments, a separate machine-readable medium 121 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations disclosed herein. In one aspect, machine-readable medium 121 may be portable and/or located separate from system 100, with the stored software instructions and/or data provided to system 100 by coupling the computer-readable medium to system 100 and/or by system 100 downloading (e.g., via a wired link and/or a wireless link) from computer-readable medium 121.

Memory component 120 comprises, in one embodiment, one or more memory devices configured to store data and information, including video image data and information. Memory component 120 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, processing component 110 may be configured to execute software instructions stored in memory component 120 so as to perform method and process steps and/or operations described herein. Processing component 110 and/or image interface 134 may be configured to store in memory component 120 images or digital image data captured by the imaging sensor 130. Processing component 110 may be configured to store processed (e.g., low-frequency non-uniformity corrected, as discussed herein) still and/or video images in memory component 120.

Image interface 134 may include, in some embodiments, appropriate input ports, connectors, switches, and/or circuitry configured to interface with external devices (e.g., a remote device 182 and/or other devices) to receive images (e.g., digital image data) generated by or otherwise stored at the external devices. The received images or image data may be provided to processing component 110. In this regard, the received images or image data may be converted into signals or data suitable for processing by processing component 110. For example, in one embodiment, image interface 134 may be configured to receive analog video data and convert it into suitable digital data to be provided to processing component 110.

In some embodiment, image interface 134 may comprise various standard video ports, which may be connected to a video player, a video camera, or other devices capable of generating standard video signals, and may convert the received video signals into digital video/image data suitable for processing by processing component 110. In some embodiments, image interface 134 may also be configured to interface with and receive images (e.g., image data) from the imaging sensor 130. In other embodiments, the imaging sensor 130 may interface directly with processing component 110.

Control component 140 comprises, in one embodiment, a user input and/or interface device, such as a rotatable knob (e.g., potentiometer), push buttons, slide bar, keyboard, and/or other devices, that is adapted to generate a user input control signal. Processing component 110 may be configured to sense control input signals from a user via control component 140 and respond to any sensed control input signals received therefrom.

Processing component 110 may be configured to interpret such a control input signal as a value, as generally understood by one skilled in the art. In one embodiment, control component 140 may comprise a control unit (e.g., a wired or wireless handheld control unit) having push buttons adapted to interface with a user and receive user input control values. In one implementation, the push buttons of the control unit may be used to control various functions of system 100, such as autofocus, menu enable and selection, field of view, brightness, contrast, noise filtering, image enhancement, and/or various other features of an imaging system or camera.

Display component 150 comprises, in one embodiment, an image display device (e.g., a liquid crystal display (LCD)) or various other types of generally known video displays or monitors. Processing component 110 may be configured to display image data and information on display component 150. Processing component 110 may be configured to retrieve image data and information from memory component 120 and display any retrieved image data and information on display component 150. Display component 150 may comprise display circuitry, which may be utilized by the processing component 110 to display image data and information. Display component 150 may be adapted to receive image data and information directly from the imaging sensor 130, processing component 110, and/or video interface component 134, or the image data and information may be transferred from memory component 120 via processing component 110.

Sensing component 160 comprises, in one embodiment, one or more sensors of various types, depending on the application or implementation requirements, as would be understood by one skilled in the art. Sensors of sensing component 160 provide data and/or information to at least processing component 110. In one aspect, processing component 110 may be configured to communicate with sensing component 160. In various implementations, sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. Sensing component 160 may represent conventional sensors as generally known by one skilled in the art for monitoring various conditions (e.g., environmental conditions) that may have an effect (e.g., on the image appearance) on the image data provided by imaging sensor 130.

In some implementations, sensing component 160 (e.g., one or more of sensors) may comprise devices that relay information to processing component 110 via wired and/or wireless communication. For example, sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, processing component 110 can use the information (e.g., sensing data) retrieved from sensing component 160 to modify a configuration of imaging sensor 130 (e.g., adjusting a light sensitivity level, adjusting a direction or angle of the imaging sensor 130, adjusting an aperture, etc.).

In various embodiments, various components of system 100 may be combined and/or implemented or not, as desired or depending on the application or requirements. In one example, processing component 110 may be combined with memory component 120, the imaging sensor 130, video interface component 134, display component 150, network interface 180, and/or sensing component 160. In another example, processing component 110 may be combined with the imaging sensor 130, such that certain functions of processing component 110 are performed by circuitry (e.g., a processor, a microprocessor, a logic device, a microcontroller, etc.) within the imaging sensor 130.

Furthermore, in some embodiments, various components of system 100 may be distributed and in communication with one another over a network 190. In this regard, system 100 may include network interface 180 configured to facilitate wired and/or wireless communication among various components of system 100 over network. In such embodiments, components may also be replicated if desired for particular applications of system 100. That is, components configured for same or similar operations may be distributed over a network. Further, all or part of any one of the various components may be implemented using appropriate components of a remote device 182 (e.g., a conventional digital video recorder (DVR), a computer configured for image processing, and/or other device) in communication with various components of system 100 via network interface 180 over network 190, if desired. Thus, for example, all or part of processor 110, all or part of memory component 120, and/or all of part of display component 150 may be implemented or replicated at remote device 182, and configured to perform resolution enhancement of images as further described herein. In some embodiments, system 100 may not comprise imaging sensors (e.g., imaging sensor 130), but instead receive images or image data from imaging sensors located separately and remotely from processing component 110 and/or other components of system 100. It will be appreciated that many other combinations of distributed implementations of system 100 are possible, without departing from the scope and spirit of the disclosure.

The main advantages of the signal demixing techniques for removing low frequency non-uniformity data from images disclosed herein in accordance with various embodiments of the disclosure include (1) effectively removing low frequency shading (non-uniformity data) for any types of camera configuration (e.g., cameras that are mounted at a fixed location) as the techniques disclosed herein are not dependent on a scene or motion of the camera, (2) causing no interruption or delay to the image or video recording, as a majority of the processing involved may be performed as a background task, outside of any critical path of recording images or video (e.g., the main signal processing path). The main signal processing path includes all essential processing performed to the images or video as they are recorded and stored in a data storage. As such, any operations performed along the main signal processing path may cause delay to the images/video recording process if the operations take too long, which may result in failure to record all captured images/video.

In other words, the signal demixing techniques disclosed herein advantageously allow for continuous capturing of image/video recording without interruption, even when the available processing resource is barely sufficient for capturing the image/video and other critical processing that is required to be performed in the image/video path. The signal demixing processing involved for identifying non-uniformity estimate can be performed as a background task (e.g., performed during idling time for the processor, etc.). When the non-uniformity estimate is finally computed, it can be applied to the recorded images or video to remove the non-uniformity data from the images or video.

Thus, for example, various embodiments of the disclosure may advantageously provide images free or substantially free of low frequency shading in applications where the processing resource is limited (e.g., while continuously recording and processing video, tec.). In this regard, in some implementation examples, various embodiments of the present disclosure may be implemented as part of a surveillance system for a structure, an unmanned aerial vehicle (UAV), unmanned aircraft system (UAS), drone, or other mobile surveillance platforms that would benefit from enhanced images free or substantially free of low frequency shading, but have limited processing resources for a continuous video stream.

Figure 2:
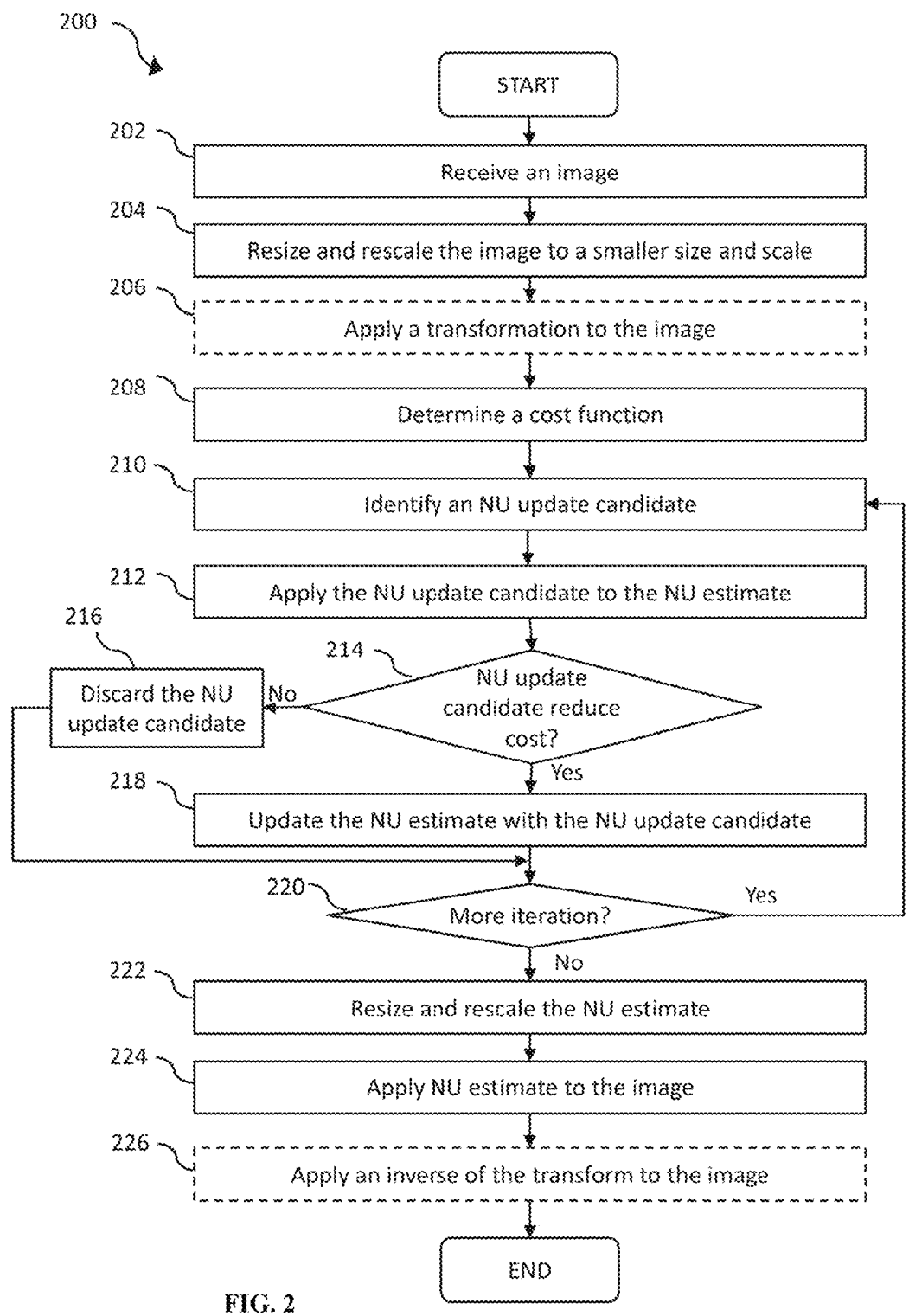
FIG. 2 illustrates a flow diagram of a process to remove non-uniformity data from images in accordance with an embodiment of the disclosure.

Turning to FIG. 2, which is a flow diagram of a process 200 to separate non-uniformity data from an image in accordance with an embodiment of the disclosure. Process 200 may be performed by various components of system 100. However, it should be appreciated that system 100 and various components thereof are identified only for purposes of giving examples, and that any other suitable system may be utilized to perform all or part of process 200. It should also be appreciated that any block, sub-block, step, sub-step, or sub-process of process 200 may be combined and/or performed in an order or arrangement different from the embodiment illustrated by FIG. 2.

At step 202, an image (such as an original image 305 of FIG. 3A) is received, for example, at processing component 110 from imaging sensor 130, or from externally captured and/or stored images or videos via image interface 134. Original image 305 is an image comprising digital image data that includes data that is part of a captured scene (e.g., scene 170) and also low frequency shading (non-uniformity data) that was introduced into the image during the image capturing process by a heat source or heat reflection other than from a desired part of the scene and affecting imaging sensor 130 or system 100, and/or by imaging sensor 130 or system 100 (e.g., due to unintended artifacts introduced by the components, such as lenses and bolometer circuits, or the operations, such as a gain correction process, of imaging sensor 130 or system 100). The original image includes an array of pixels, where each pixel has pixel data that represents a value along a modality or spectrum (e.g., color, luminance, infrared, thermal, etc.) for the pixel. For example, original image 305 may be captured by a CCD or CMOS sensor, an IR imaging sensor, PMD or other ToF imaging sensor, LIDAR imaging device, millimeter wave imaging sensor, or other imaging sensors. In one example, original image 305 may be an IR image captured in a native resolution such as 640×480, 1024×768, 1536×1024, or other resolution, with pixel values that lie within a native dynamic range (a native dynamic scale) along the IR spectrum.

Figures 3A, 3B, 3C:
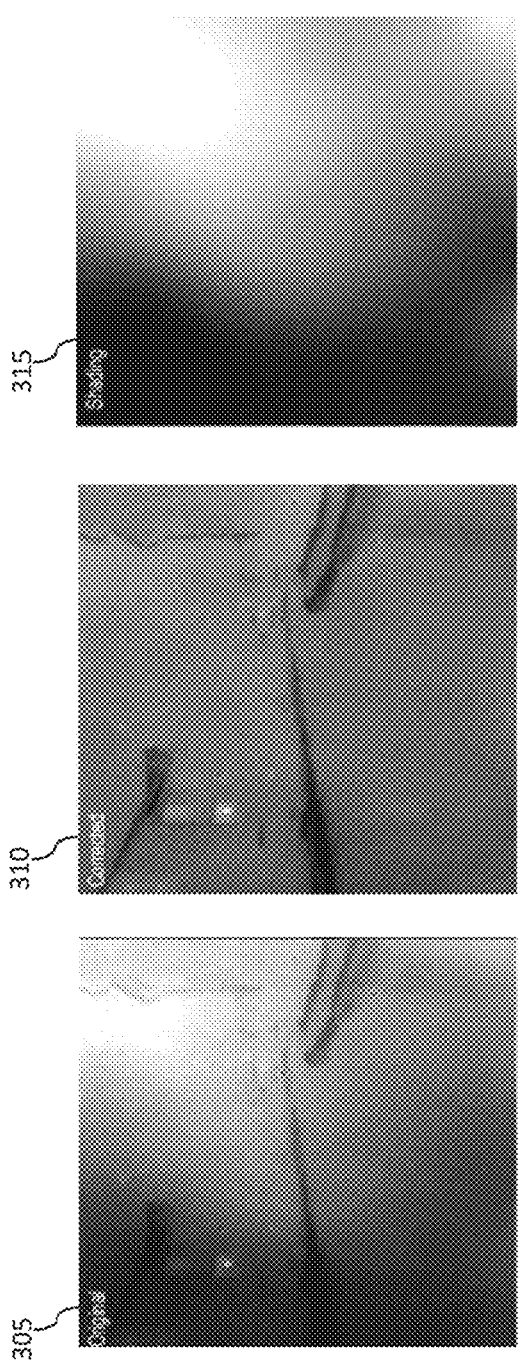
FIGS. 3A, 3B, and 3C illustrate an original image, a corrected image, and a non-uniformity representation that was used to correct the original image to generate the corrected image in accordance with various embodiments of the disclosure, respectively.

Original image 305 may suffer from having non-uniformity data (low frequency shading) mixed among the actual image data of the scene. As shown, the top left and bottom left corners of original image 305 appear to have significant negative shading (dark spots that are centered around the top left corner and the bottom left corners), and the areas near the top right corner and bottom right corner appear to have positive shading (bright spots that are centered around the top right and bottom right corners). By contrast, FIG. 3B illustrates an image 310 after the non-uniformity data has been removed from original image 305, for example, by applying a signal demixing process as disclosed herein to original image 305. FIG. 3C illustrates a representation of the non-uniformity data (shading) that was removed from original image 305 to generate corrected image 310.

It has been observed that non-uniformity data (low frequency shading) is smooth without sharp transitions (as shown in shading 315 of FIG. 3C for example), and that a low resolution approximation of the original image is sufficient to capture the non-uniformity data. As such, in order to improve the speed and efficiency of the demixing process, in some embodiments, at step 204, image 305 may be resized to a smaller size with a lower resolution such as 80×60, 160×120, 320×240, or other resolution that is smaller than the native resolution of image 305. In addition, for ease of operation, the dynamic range may be converted (e.g., normalized) to a limited scale (e.g., between 0 and 1). Thus, at step 204, the pixel values of the image are also converted from the native dynamic range to the limited (e.g., normalized) scale to generate a resized image 420.

It has also been observed that objects and scenes in infrared images are generally piece-wise flat. In other words, the thermal energy in the scene can change from object to object, but does not vary much within each object or within each part of an object. The minimization of the total-variation is a form of image regularization known to promote piecewise constant components. Interestingly, non-uniformity data (low-frequency shading) that was introduced into the image during capturing of the image increases the total variation of the image, as the non-uniformity data usually causes slopes of image intensity. For example, the shading in original image 305 causes the top left corner and bottom left corner of image 305 to be darker than it should be, and causes an area near the top right corner of image 305 to be brighter than it should be, making original image 305 appear to have substantially higher total variation than corrected image 310.

Figure 8A:
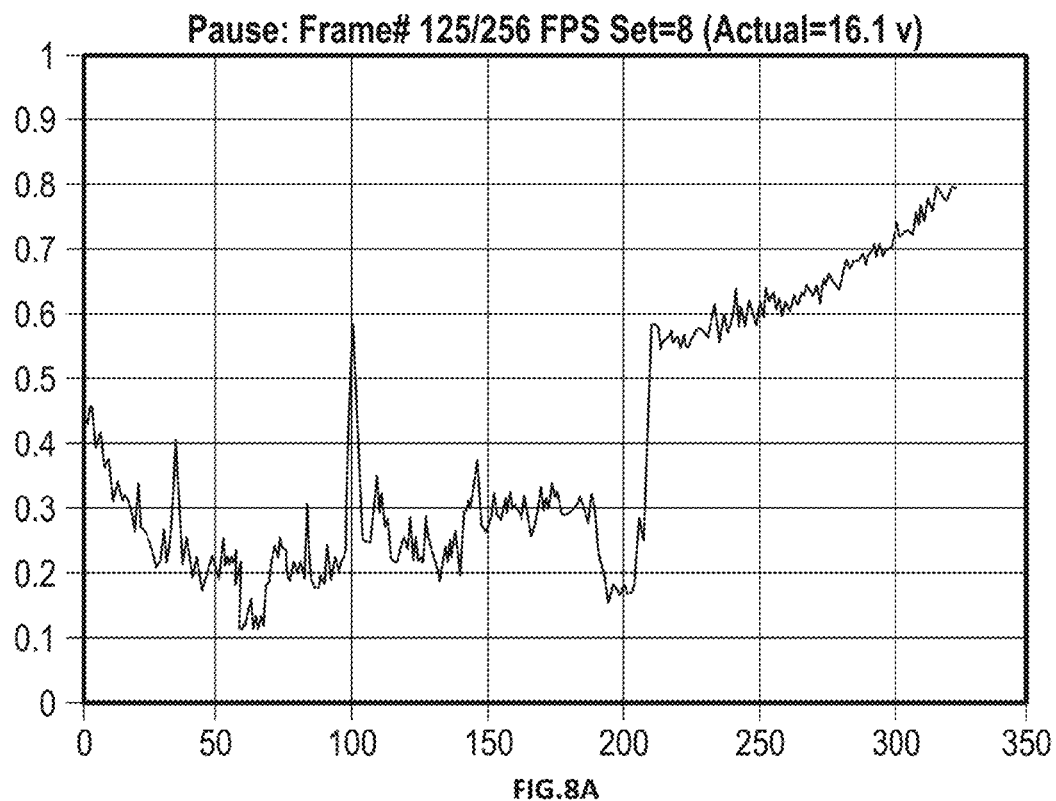
FIG. 8A illustrates pixel values of a cross section of an original image and FIG. 8B illustrates a corrected image obtained from applying a signal demixing process in accordance with various embodiments of the disclosure to the original image.
Figure 8B:
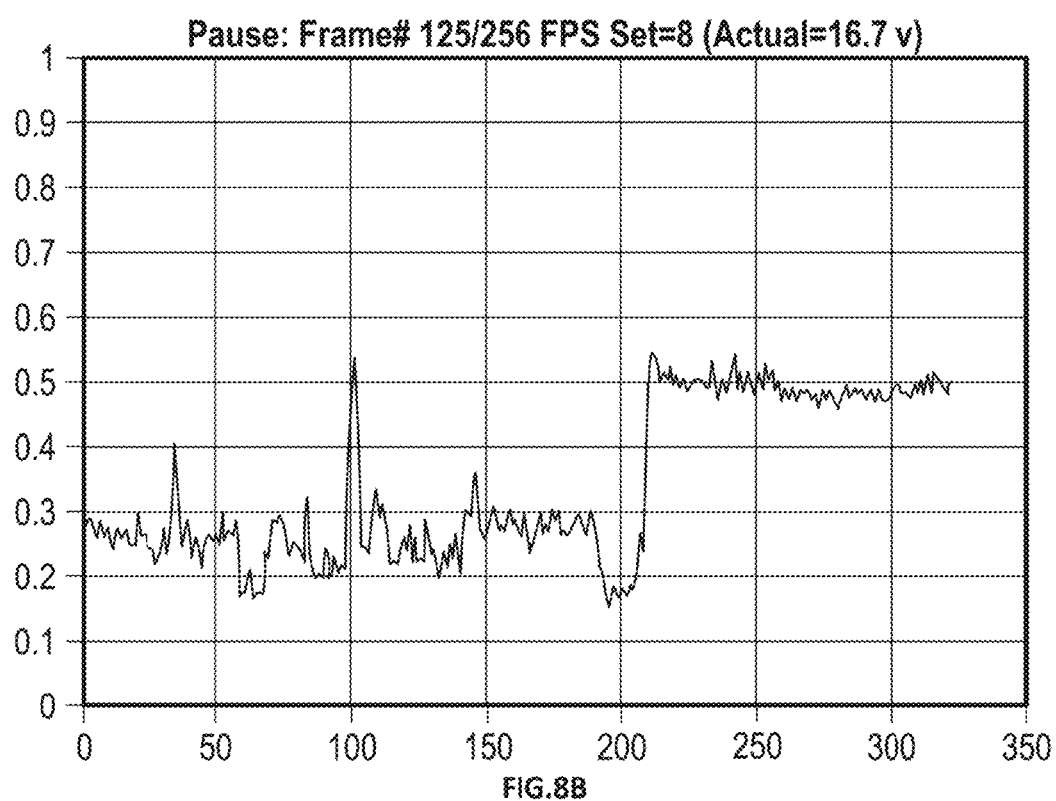

FIG. 8A illustrates various pixel values of a cross section of an original image (e.g., original image 305), and FIG. 8B illustrates pixel values of the same cross section of a corrected image, for example, obtained from the process described herein in accordance with various embodiments (e.g., corrected image 310). As shown, the pixel values in FIG. 8B are significantly flatter than the pixel values in FIG. 8A.

In addition, as mentioned above, non-uniformity data is usually smooth without sharp transitions, as shown in the shadings in original image 305. It has been contemplated that the overall non-uniformity data (low frequency shading) of an image can be modeled as a combination of one or more 2D bump functions (e.g., 2D Gaussian functions/curves). Thus, when estimating the non-uniformity data for an image, an iterative process of selecting 2D bump functions to be added to the non-uniformity estimate may be used. Embodiments of the disclosure discussed below are illustrated with respect to 2D Gaussian functions as a specific example, but other 2D bump-like functions can be utilized in place of or in addition to 2D Gaussian functions as mentioned herein above.

Given the general characteristics of the non-uniformity data described above, the quality of a non-uniformity estimate or the quality any one of the 2D Gaussian functions that compose the non-uniformity estimate may be evaluated based on the following: first, the non-uniformity estimate should minimize the total variation among pixel values of the corrected image, and second, the energy of the gradient of the non-uniformity estimate is low. As such, at step 208, a cost function for computing a quality of a non-uniformity estimate or a quality of a 2D Gaussian function for the non-uniformity estimate is determined. In some embodiments, the cost function takes into account (1) a total variation among pixel values of a corrected image after the non-uniformity estimate is applied to an image and (2) the energy of the gradient of the non-uniformity estimate.

It has been contemplated that the total variation among pixel values of a corrected image can be computed using the following equation:

$$TV = \|\nabla[im - NU_{i-1}]\|_1^2 \quad (1)$$

and the energy of the gradient of the non-uniformity estimate can be computed using the following equation:

$$\varepsilon = \|\nabla NU_{i-1}\|_2^2 \quad (2)$$

where TV is the total variation, im is the original image (normalized to a range of 0 to 1, inclusive, in some embodiments), NU is the non-uniformity estimate (normalized to a range of 0 to 1, inclusive, in some embodiments), [im-NU] is the cleaned image after the non-uniformity estimate NU has been applied to the original image im, and $\varepsilon$ is the energy of the gradient of the non-uniformity estimate NU, $$\text{where } \|x\|_1 = \Sigma_{i=1}^n |x_i| \quad (3)$$

$$\text{where } \|x\|_2^2 = \Sigma_{i=1}^n |x_i|^2 \quad (4)$$

It is noted that it may not be possible to minimize both the total variation and the energy of the non-uniformity estimate simultaneously, therefore, a preferable cost function should find a balance between the two factors. In some embodiments, the cost function may include a weight that is associated with the total variation and a weight that is associated with the energy of the non-uniformity estimate. The cost function of some of these embodiments may be expressed as:

$$Cost = \lambda_1 \times TV + \lambda_2 \times \varepsilon \qquad (5)$$

where $\lambda_1$ is the weight associated with the total variation and $\lambda_i$ is the weight associated with the energy of the non-uniformity estimate.

As such, in some embodiments, at step 208, determining the cost function includes assigning a first weight ($\lambda_i$) to the total variation factor and assigning a second weight ($\lambda_2$) to the non-uniformity estimate energy factor. The weights could be determined a priori based on empirical data, or could be modified by an operator of the system 100 or automatically by the system 100.

A non-uniformity estimate of some embodiments may be represented as an image having the same size as the processed image (the image after being resized and resealed), but includes only data related to the non-uniformity artifact (the low frequency shading) of the processed image. For example, the non-uniformity estimate generated for original image 305 of FIG. 3A may be represented as non-uniformity estimate 315 of FIG. 3C. As shown, non-uniformity estimate 315 includes dark areas (negative shading) at the top left corner and the bottom left corner, and bright areas (positive shading) at the top right corner and the bottom right corner. Applying the non-uniformity estimate 315 to original image 305 would yield corrected image 310. In some embodiments, applying the non-uniformity estimate 315 to original image 305 includes subtracting non-uniformity estimate 315 from original image 305.

Different embodiments utilize different techniques to construct a non-uniformity estimate for an image. In some embodiments, an iterative addition approach may be used to construct the non-uniformity estimate. Under this iterative addition approach, the non-uniformity estimate may be iteratively updated. Each update may include an adjustment to the non-uniformity estimate. As mentioned above, a non-uniformity estimate can be composed by one or more 2D Gaussian functions. Thus, a non-uniformity update may include adding an additional 2D Gaussian function to the non-uniformity estimate. Another update may include adjusting (e.g., diffusing) the one or more 2D Gaussian functions in the non-uniformity estimate.

Figure 4:
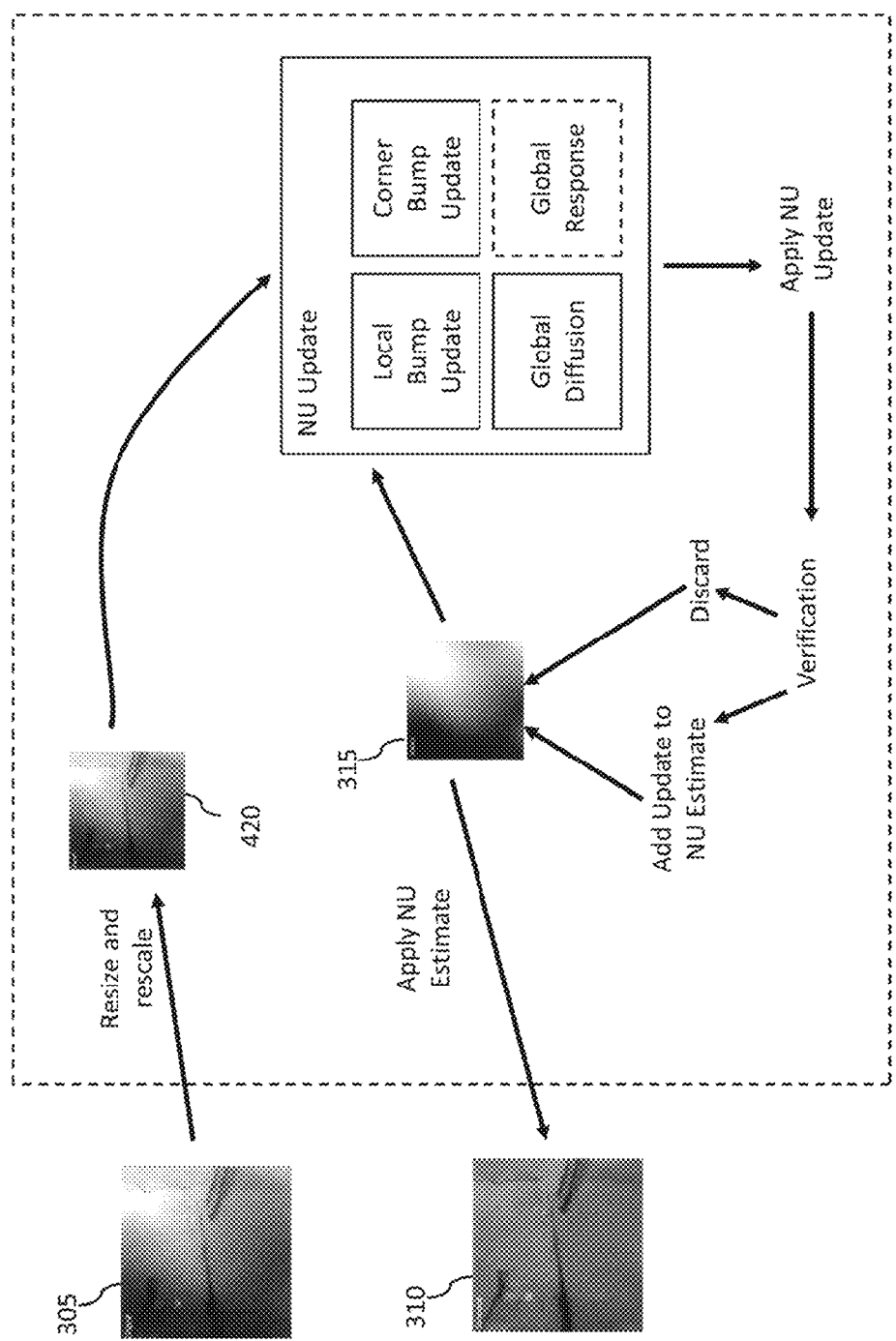
FIG. 4 illustrates the iterative process of generating non-uniformity estimates for removing non-uniformity data from images according to various embodiments of the disclosure.

Therefore, after the cost function is determined, a new non-uniformity update candidate is identified (at step 210). As shown in FIG. 4, the new non-uniformity update candidate may be one of the following three types of update candidate: a local bump update, a corner bump update, and a global diffusion update. A local bump includes a 2D Gaussian function disposed at a random location within the non-uniformity estimate. A corner bump is similar to a local bump, and also includes a 2D Gaussian function. Unlike the local bump however, the 2D Gaussian function of a corner bump may only be placed at a random position in or around one of the corners of the non-uniformity estimate to address shading in the corners of the image. While each generated 2D Gaussian function is supposed to be smooth without sharp edges, sharp edges may be created when multiple 2D Gaussian functions are overlaid on top of each other. Thus, a global diffusion may be applied to smooth out the 2D Gaussian functions that are already placed on the non-uniformity estimates. In some embodiments, a global diffusion includes applying a low pass filter to the non-uniformity estimate.

In some embodiments, process 200 may randomly select one of the three types of update at this step 210. Preferably, one or more types of update should be selected more often than others. For example, the local bump has a higher priority than the corner bump and the global diffusion, while the corner bump has a higher priority than the global diffusion. As such, process 200 of some embodiments may apply different priorities to the different non-uniformity update types. In one example, the local bump is selected the majority (e.g., 80%, 70%, etc.) of the time, a corner bump is selected more often than the global diffusion, but still less than the local bump (e.g., 10%, 20% of the time, etc.), and a global diffusion is selected the least frequently (e.g., 3%, 5% of the time, etc.). The selection of the non-uniformity update type may be implemented as a randomizer having different weights assigned to the different update types. For example, for a randomizer program that randomly outputs a value between 0 and 1 each time it is executed, the process 200 may select the local bump when the output is less than 0.8, select the corner bump when the output is between 0.8 and 0.9, and selects the global diffusion when the output is between 0.9 and 0.93.

Figure 5:
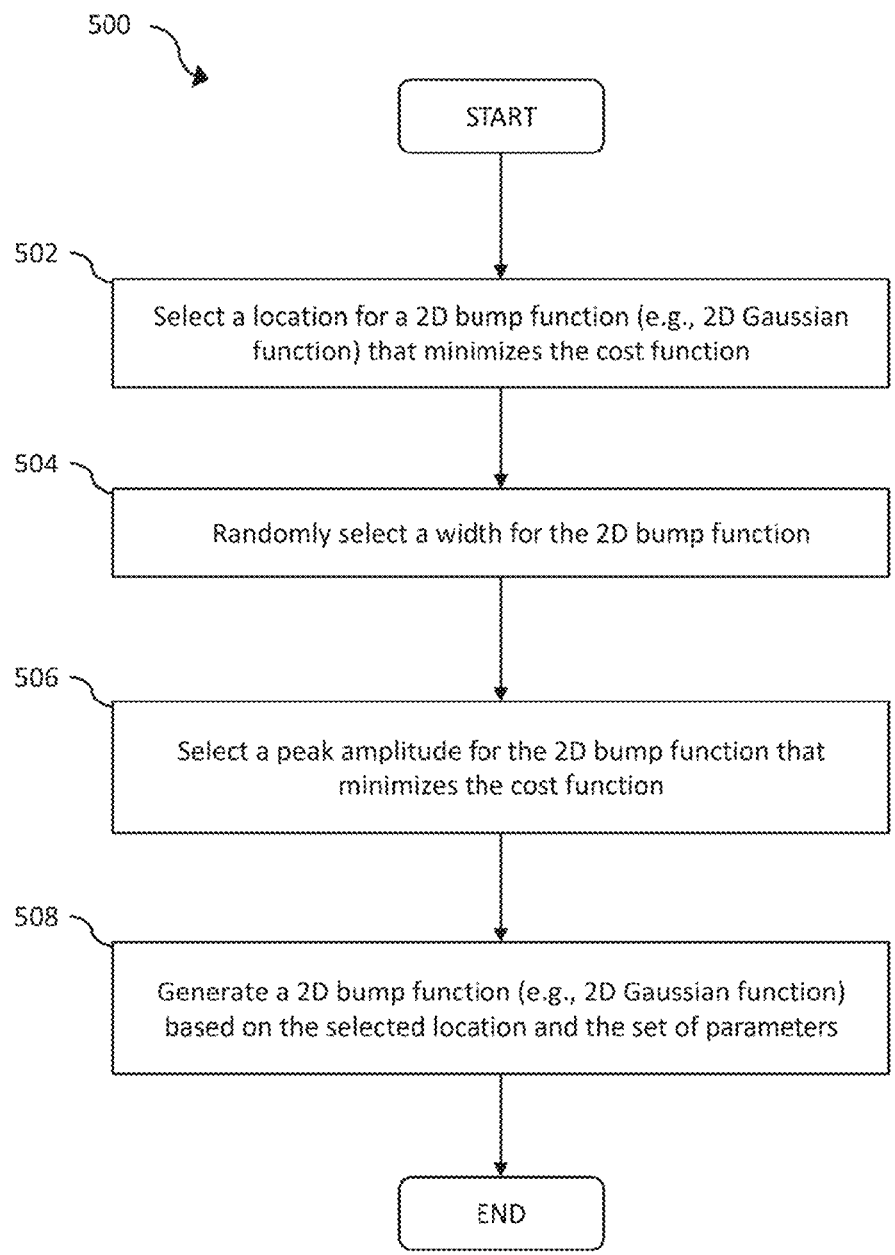
FIG. 5 illustrates a flow diagram of a process to generate a non-uniformity update candidate of a local bump type in accordance with various embodiments of the disclosure.

If a local bump is selected at step 210, a non-uniformity update candidate of a local bump type may be generated. FIG. 5 illustrates a process 500 for generating a non-uniformity update candidate when a local bump is selected as the update type. At step 502, a location is selected for a 2D Gaussian function that minimizes the cost function (e.g., the cost function that was determined at step 208). In some embodiments, the location may be randomly selected anywhere on the processed image, for example, by using a randomizer as described above. In some embodiments, step 502 can be performed by first identifying multiple location candidates on the non-uniformity estimate, testing the location candidates, and identifying a location that provides a minimal cost based on the cost function determined at step 208. In some embodiments, the minimization of the cost function can be performed by a nonlinear direct-search minimization algorithm, such as the coordinate descent method, the Nelder-Mead downhill simplex method, or particle swarm optimization. At step 504, a width is selected for the 2D Gaussian function. Similar to the location, the width may also be randomly selected, for example, by using a randomizer.

At step 506, a peak amplitude for the 2D Gaussian function that minimizes the cost function (e.g., the cost function that was determined at step 208) is selected. In some embodiments, step 506 can be performed by first defining a range of amplitudes (e.g., signed amplitudes, including positive and negative values), testing several peak amplitudes within that range, and identifying a peak amplitude that provides a minimal cost based on the cost function determined at step 208. Preferably, more than one peak amplitudes are tested, and even more preferably, a large number of peak amplitudes (e.g., 0.1, 0.2, 0.25, 0.3, −0.1, −0.2, −0.25, −0.3, etc.) are tested to identify the peak amplitude that produce the least cost based on the cost function. The different peak amplitudes to be tested may be generated randomly using a randomizer as discussed above, or alternatively, the different peak amplitudes may be generated as a pre-determined ordered sequence within the range. In some embodiments, the minimization of the cost function can be performed by a nonlinear direct-search minimization algorithm, such as the coordinate descent method, the Nelder-Mead downhill simplex method, or particle swarm optimization.

As discussed above, the cost function is based on a total variation among pixel values of an image and an energy of the gradient of the non-uniformity estimate. In some embodiments, for each tested peak amplitude, a hypothetical non-uniformity estimate is generated at this step 506 by adding the 2D Gaussian function having the tested amplitude to the non-uniformity estimate (that was generated in the previous iteration). Then, the cost for each tested 2D Gaussian function (varying the amplitude) may be computed at this step 506 by using the generated hypothetical non-uniformity estimate in the cost function, e.g., equation (5).

Thus, in steps 506 and 508, the cost is computed for the different peak amplitudes and locations to identify a peak amplitude and a location that produce the least cost among the different peak amplitudes. The identified peak amplitude is then selected for the non-uniformity update candidate. Although the selection of the peak amplitude and the location for the 2D Gaussian function is described two separate steps 506 and 508 for purposes of illustrating an example embodiment, it is also contemplated that the selection of the peak amplitude and the location may be performed together to determine a combination of a peak amplitude and a location that minimizes the cost function, for example, by randomizing and testing different combinations of peak altitudes and locations or by performing a direct-search minimization algorithm with a combination of a peak altitude and a location as a variable.

After selecting the peak amplitude and the location that minimize the cost function, a 2D Gaussian function having a selected width and peak amplitude is generated at step 508. In some embodiments, the 2D Gaussian function can be expressed as follows:

$$G(x, c, \sigma_G) = c_1 \times \left(\frac{1}{2\pi\sigma_G^2}\right)^{\left(\frac{1}{2} \times \frac{(x-c_2)^2}{\sigma_G^2}\right) + \left(\frac{1}{2} \times \frac{(y-c_3)^2}{\sigma_G^2}\right)} \quad (6)$$

where $G(x, c, \sigma_G)$ is the Gaussian function given a two-dimensional coordinates (x and y), $c_1$ represents the (signed) peak amplitude of the Gaussian function, $c_2$ and $c_3$ represent the two-dimensional coordinates of the location of the Gaussian function on the processed image, and $\sigma_G$ represents the width (size or spread) of the Gaussian function.

Given the above equation (6), a perturbation (the hypothetical non-uniformity estimate) can be expressed as:

$$\Pi(v_{i-1}, c) = v_{i-1} + G(x, c, \sigma_G) \quad (7)$$

where $v_{i-1}$ represents the current non-uniformity estimate.

Figure 6:
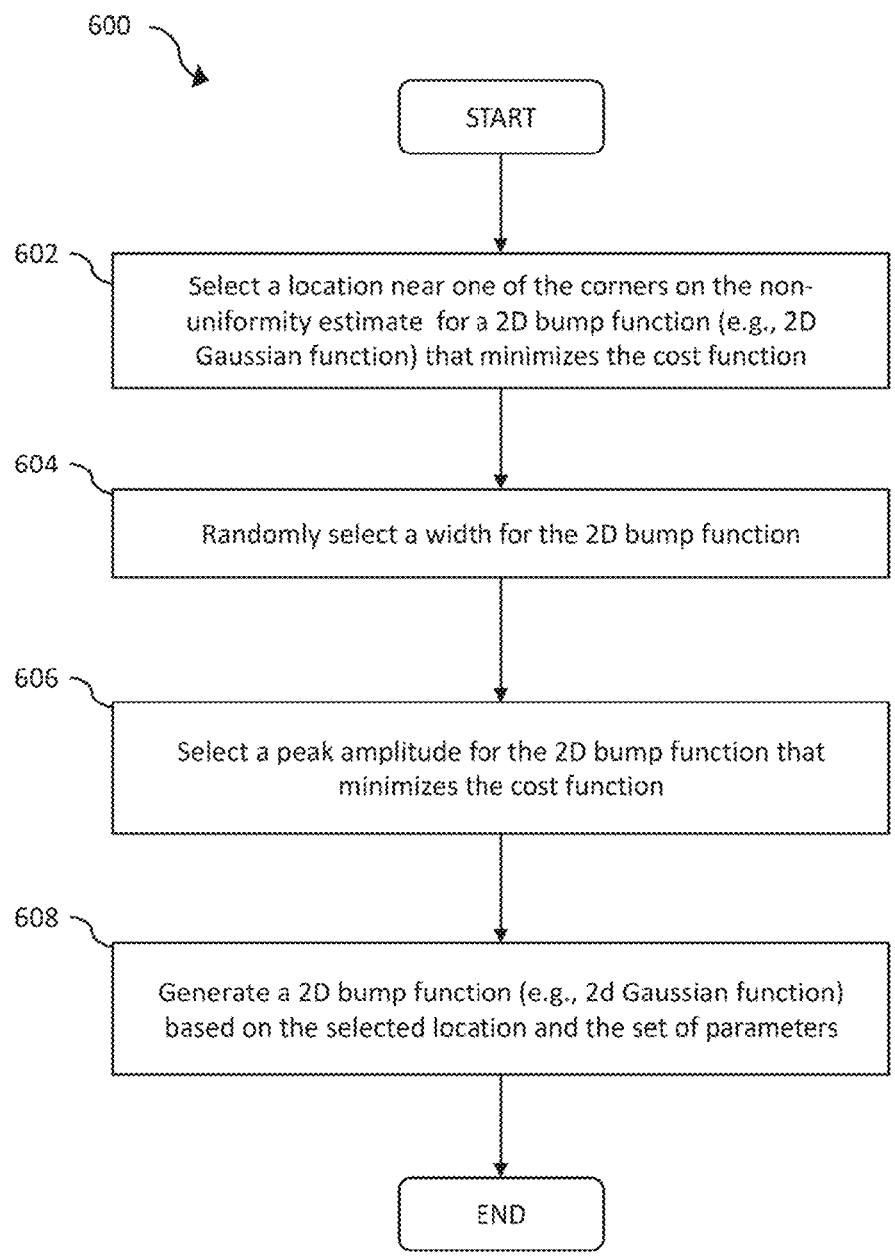
FIG. 6 illustrates a flow diagram of a process to generate a non-uniformity update candidate of a corner bump type in accordance with various embodiments of the disclosure.

If a corner bump is selected at step 210, a non-uniformity update candidate of a corner bump type may be generated. FIG. 6 illustrates a process 600 for generating a non-uniformity update candidate when a corner bump is selected as the update type. The process 600 is similar to the process 500, except that at step 602, instead of selecting a location for the 2D Gaussian function from any location on the processed image to minimize the cost function, the selection of a location that minimizes the cost function is made from among locations near (e.g., in or around) one of the corners. In some embodiments, the corner location that may be selected at this step 602 is limited by imposing arbitrary boundaries around the corners of the non-uniformity estimate. For example, a boundary that is within a pre-determined distance from any one of the corners of the processed image may be imposed in this selection step 602. The corner location may be randomly selected within, for example, by using a randomizer as described above. In some embodiments, step 602 can be performed by first identifying multiple location candidates on the non-uniformity estimate, testing the location candidates, and identifying a location that provides a minimal cost based on the cost function determined at step 208. In some embodiments, the minimization of the cost function can be performed by a nonlinear direct-search minimization algorithm, such as the coordinate descent method, the Nelder-Mead downhill simplex method, or particle swarm optimization. At step 604, a width is selected for the 2D Gaussian function. Similar to the location, the width may also be randomly selected, for example, by using a randomizer.

At step 606, a peak amplitude for the 2D Gaussian function that minimizes the cost function that was determined at step 208 is selected. In some embodiments, the step 606 may be performed by first defining a range of amplitudes, testing several peak amplitudes within that range, and identifying a peak amplitude that provides a minimal cost based on the cost function determined at step 208. Preferably, more than one peak amplitudes are tested, and even more preferably, a large number of peak amplitudes (e.g., 0.1, 0.2; 0.25, 0.3, −0.1, −0.2, −0.25, −0.3, etc.) are tested to identify the peak amplitude that produce the least cost based on the cost function. In some embodiments, the minimization of the cost function can be performed by a nonlinear direct-search minimization algorithm, such as the coordinate descent method, the Nelder-Mead downhill simplex method, or particle swarm optimization. The different peak amplitudes to be tested may be generated randomly using a randomizer as discussed above, or alternatively, the different peak amplitudes may be generated as a pre-determined ordered sequence within the range.

As discussed above, the cost function is based on a total variation among pixel values of an image and an energy of the gradient of the non-uniformity estimate. In some embodiments, for each tested peak amplitude, a hypothetical non-uniformity estimate is generated at this step 606 by adding the 2D Gaussian function having the tested peak amplitude to the non-uniformity estimate (that was generated in the previous iteration). Then, the cost for each tested 2D Gaussian function (varying the amplitude) may be computed at this step 606 by using the generated hypothetical non-uniformity estimate in the cost function, e.g., equation (5). The cost is computed for the different peak amplitudes to identify a peak amplitude that produces the least cost among the different peak amplitudes. The identified peak amplitude is then selected for the non-uniformity update candidate.

After selecting the peak amplitude and the location that minimize the cost function, a 2D Gaussian function having the selected location, width, and peak amplitude is generated at step 608. In some embodiments, the 2D Gaussian function can be expressed as shown in equation (6).

If a global diffusion is selected at step 210, a non-uniformity update candidate of a global diffusion type may be generated. As mentioned above, a global diffusion may include a filter (e.g., a low pass filter, etc.) that is applied to the current non-uniformity estimate with the objective of smoothening the 2D Gaussian functions that are included in the current non-uniformity estimate. In some of these embodiments, the perturbation (the hypothetical non-uniformity estimate after the global diffusion is applied to the current non-uniformity estimate) can be represented as a convex combination between the current non-uniformity estimate and a smoothed version of itself, which can be expressed as:

$$\Pi(v_{i-1}, c) = c_1 \times v_{i-1} + (1 - c_1) Y(v_{i-1}) \quad (8)$$

where $v_{i-1}$ represents the current non-uniformity estimate, Y is a smoothing operator (e.g., a convolution against the kernels of the Gaussian functions in the current non-uniformity estimate), and $c_1$, representing a convex combination parameter, is a number between 0 and 1, inclusively.

In some embodiments, while the smoothing operator Y may remain constant (pre-determined), various convex combination parameters may be tested to identify a convex combination parameter $c_1$ that minimizes the cost function. Preferably, more than one convex combination parameters are tested, and even more preferably, a large number of convex combination parameters (e.g., 0.1, 0.2, 0.5, 1.0, etc.) are tested to identify the convex combination parameter that produces the least cost based on the cost function. The different convex combination parameters to be tested may be generated randomly using a randomizer as discussed above, or alternatively, the different convex combination parameters to be tested may be generated as a pre-determined ordered sequence within the range between 0 and 1. Other minimization techniques may be utilized in some embodiments.

As discussed above, the cost function is based on a total variation among pixel values of an image and an energy of the gradient of the non-uniformity estimate. Thus, each tested variation of the convex combination parameter may generate a perturbation (hypothetical non-uniformity estimate) using equation (8) by varying the parameter $c_1$. The cost for each tested convex combination parameter may then be computed using the generated perturbation (hypothetical non-uniformity estimate) in the cost function, e.g., equation (5). The cost is computed for the different convex combination parameters to identify a convex combination parameters that produces the least cost among the different convex combination parameters. The identified convex combination parameter is then selected for the non-uniformity update candidate.

Returning back to FIG. 4, once a non-uniformity update candidate has been identified, it needs to be verified that the new non-uniformity update candidate actually improves the non-uniformity estimate, rather than worsening the non-uniformity estimate, in terms of the cost function. In some embodiments, a comparison between a cost computed for the current non-uniformity estimate and a cost computed for a hypothetical non-uniformity estimate, after the new non-uniformity update candidate is applied to the current non-uniformity estimate, are compared against each other.

In some embodiments, the new non-uniformity update candidate is added to the current non-uniformity estimate if the cost computed for the hypothetical non-uniformity estimate is less than the current non-uniformity estimate, that is, the non-uniformity update candidate improves the current non-uniformity estimate. It then follows, that the new non-uniformity update candidate is discarded if the cost computed for the hypothetical non-uniformity estimate is larger than (or equal to) the current non-uniformity estimate, that is, the non-uniformity update candidate does not improve the current non-uniformity estimate.

As such, at step 212, the new non-uniformity update candidate is applied to the current non-uniformity estimate to generate the hypothetical non-uniformity estimate. At step 214, it is determined whether the new non-uniformity estimate actually improves the current non-uniformity estimate (e.g., whether the update candidate reduces the cost). If it is determined that the new non-uniformity update candidate does not reduce the cost, the new uniformity update candidate is discarded (at step 216). That is, the non-uniformity estimate after the current iteration remains the same as the previous iteration. However, if it is determined that the new non-uniformity update candidate reduces the cost, the non-uniformity estimate is updated (at step 218) with the new non-uniformity update candidate (e.g., adding the new non-uniformity update candidate to the current non-uniformity estimate).

As mentioned above, this process of updating the non-uniformity estimates can be repeated as many times as needed. In some embodiments, a fixed number of iterations may be used (pre-determined). In other embodiments, process 200 may continue to repeat the process until a termination condition exists. For example, process 200 may stop to repeat the process when the newly identified non-uniformity update candidate is discarded (e.g., when it does not reduce the cost anymore) for a fixed number of times.

Figure 9A:
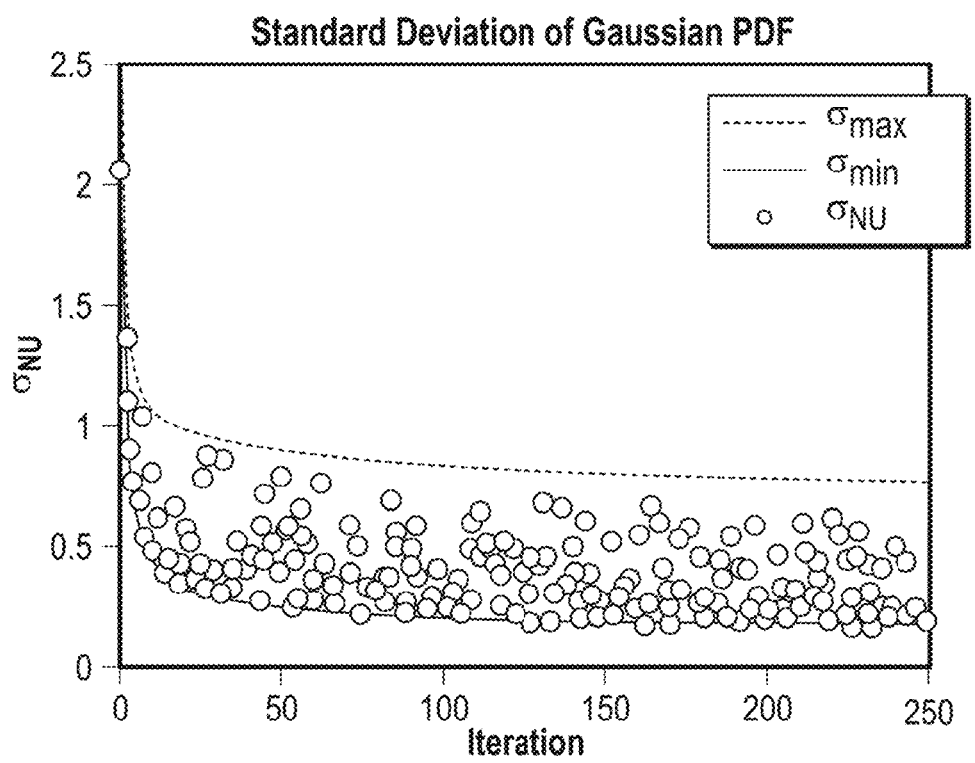
FIG. 9A illustrates the generated Gaussian function width parameters in relation to the number of iteration when selecting a non-uniformity update candidate of a local bump type in accordance with various embodiments of the disclosure.
Figure 9B:
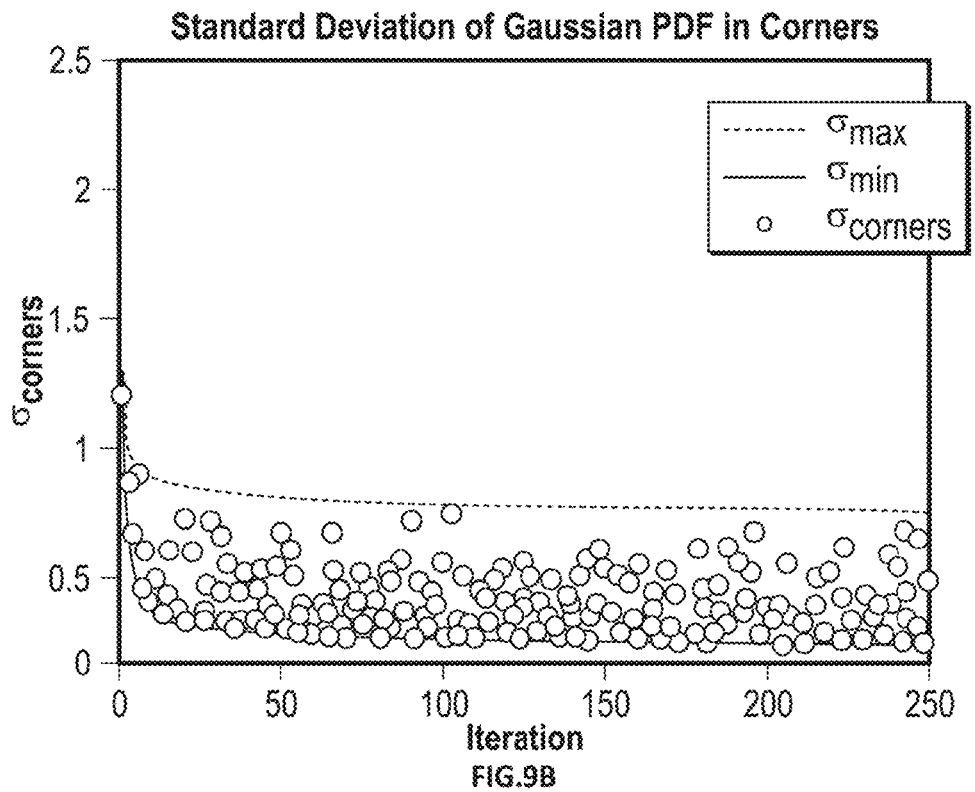
FIG. 9B illustrates the generated Gaussian function width parameters in relation to the number of iteration when selecting a non-uniformity update candidate of a corner bump type in accordance with various embodiments of the disclosure.

As such, at step 220, process 200 determines whether more iteration should be performed. If it is determined that more iteration should be performed, the process 200 returns to step 210 and repeats steps 210 through 220 to continue to update and improve the non-uniformity estimate. As mentioned above, the iterative process continues to update the non-uniformity estimate by iteratively adding new 2D Gaussian functions or applying filters that would render the non-uniformity estimate as close to the non-uniformity data on the original image as possible. Preferably, this process is repeated a large number of times (e.g., 100, 200, 500). In some embodiments, process 200 may adjust one or more parameters for selecting the non-uniformity update candidate as it iterates steps 210 through 220. For example, process 200 may adjusts the width (e.g., the size or spread as determined by $\sigma_G$) of the 2D Gaussian functions as it progresses. In some embodiments, process 200 begins with selecting a larger width (sizes/spreads) (e.g., by assigning a larger value for the parameter $\sigma_G$ in equation (6)) for the 2D Gaussian functions when the local bump or the corner bump is selected, and progressively reduces the width (size/ spread) (e.g., by progressively reducing the value for the parameter $\sigma_G$ in equation (6)) as the number of iterations increases. In some embodiments, the parameter $\sigma_G$ is selected randomly in each iteration (by using a randomizer as described above). This may be implemented, in some of these embodiments, by setting a maximum bound and a minimum bound for the parameter $\sigma_G$ and slowly reducing both of the maximum and minimum bounds as the number of iterations increases. FIG. 9A illustrates an example set of $\sigma_G$ values in relation to the number of iterations for the local bump, and FIG. 9B illustrates an example set of $\sigma_G$ values in relation to the number of iterations for the corner bump.

However, if it is determined that no more iteration should be performed, the process 200 may output the current non-uniformity estimate, and apply it to one or more images or frames. Since the non-uniformity estimate was generated based on the processed image (that was resized and resealed), before the current non-uniformity estimate can be used on the images, the current non-uniformity estimate is, at step 222, resized to the native size of the original image, and resealed to the native dynamic range of the original image. The resized and resealed non-uniformity estimate may then be applied (at step 224) to the original image to generate a corrected image (e.g., corrected image 310). In some embodiments, applying the non-uniformity estimate to the original image includes subtracting the non-uniformity estimate from the original image.

It is noted that processing component 110 may be configured to perform a series of critical image processes to images/video received from imaging sensor 130 in a main signal path (e.g., a main video processing chain, including other operations such as automatic gain control, other types of noise suppression, gain and offset adjustment, and/or other operations to generate suitable image data for displaying or for further processing) before outputting or storing the images/video. As discussed above, one of the advantages of the demixing techniques in accordance to various embodiments disclosed herein is that some of the non-uniformity estimation operations may be performed outside of the main signal path, so that this technique can be implemented in devices having limited processing resources. For example, the steps of determining the cost function (step 208), identifying a non-uniformity update candidate (step 210), applying the non-uniformity update candidate to the non-uniformity estimate (step 212), determining whether the non-uniformity update candidate reduce the cost according to the cost function (step 214), updating the non-uniformity estimate with the non-uniformity update candidate (step 218), and resize and rescale the non-uniformity estimate (step 222) may be performed as a background process outside of the main signal path performed by processing component 110 to all images received from imaging sensor 130. In some embodiments, processing component 110 may be configured to select one image out of a number of received images periodically (e.g., every 100 images, every hour, etc.) to perform this non-uniformity estimate generation process in the background. Once signal demixing module 112 has generated a non-uniformity estimate for the selected image, processing component 110 of some embodiments is configured to apply the non-uniformity estimate to all of the received images (step 224) as part of the main signal path.

In this regard, processing component 110 according to some embodiments may comprise different combinations of hardware processors, PLDs, DSPs, application specific integrated circuits (ASICs), and/or other logic devices, one or more of which are configured to perform the non-uniformity estimate generation process (e.g., steps 208-204, 218, and 222) in the background while one or more others of which are configured to perform the main signal path processing. Various implementations are contemplated, for example: an implementation that includes a multi-core and/or multi-threaded processor/DSP configured to perform the non-uniformity estimate generation in one or more cores/threads and the main signal path processing in one or more other cores/threads; an implementation that includes a processor/DSP configured to perform the non-uniformity estimate generation and the main signal path processing concurrently through context switching and multitasking; an implementation that includes one or more processors/DSPs configured to perform the non-uniformity estimate generation and one or more other processors/DSPs configured to perform the main signal path processing; an implementation that includes one or more processors/DSPs configured to perform the non-uniformity estimate generation and one or more of PLDs, ASICs, and other hardware logic devices configured to perform the main signal path processing; an implementation that includes one or more of PLDs, ASICs, and other hardware logic devices configured to perform the non-uniformity estimate generation and one or more processors/DSPs configured to perform the main signal path processing; an implementation that includes one or more of PLDs, ASICs, and other hardware logic devices configured to perform the non-uniformity estimate generation and one or more of other PLDs, ASICs, and other hardware logic devices configured to perform the main signal path processing; and any other suitable configuration combinations of processors, PLDs, DSPs, ASICs, and other hardware logic devices.

It is noted that the non-uniformity data introduced into an image may be modeled as an additive component, as a multiplicative component, or as one of the various combinations of these two components. When the non-uniformity data is purely additive, applying the non-uniformity estimate to the original image can be performed as described above by simply subtracting the non-uniformity estimate from the original image. When the non-uniformity data is purely multiplicative, applying the non-uniformity estimate to the original image can be performed by dividing the original image by the non-uniformity estimate. Alternatively, the application of the non-uniformity estimate can be operated in logarithmic space. For example, the original image may first be converted into logarithmic space before subtracting the non-uniformity data from the original image, which may be expressed as:

$$im_{trans} = \ln(im) - NU \qquad (9)$$

where im is the original image and NU is the non-uniformity estimate. NU and im may represent the non-uniformity estimate and the original image that have been normalized to a range of [0, 1], according to some embodiments.

After applying the non-uniformity data to the original image in the logarithmic space, the result is transformed back to its original space by:

$$im_{corrected} = e^{im_{trans}} \qquad (10)$$

When the non-uniformity data has a combination of additive and multiplicative components, the images or frames may be processed through an additive-multiplicative transformation (at step 206 of FIG. 2) to generate a transformed image before performing the iterative process of generating the non-uniformity estimate. In some embodiments, the transformation may be applied to the processed image that has been resized and resealed. The non-uniformity estimate is generated based on the transformed image. After the non-uniformity estimate is generated, and then resized and resealed, it is applied to the transformed image at step 224. The transformed image needs to be reverted back to the original format. As such, at the addition step 226, an inverse of the transformation is applied to the transformed image to generate the corrected image.

The additive-multiplicative transformation needs to take into account the various extents that the additive and multiplicative components may attribute to the non-uniformity data. In one example, the additive-multiplicative transformation may be expressed as:

$$f_q(im) = \frac{\ln(1 + q^2 im)}{\ln(1 + q^2)} \qquad (11)$$

where q is a parameter (a real number) that represents the additive or multiplicative nature of the non-uniformity data, and im represents the original image normalized to a range of 0 to 1, inclusive ($0 \leq$ pixel values in im $\leq 1$).

The parameter q increases when the non-uniformity data has more multiplicative components, and the parameter q decreases when the non-uniformity data has more additive components. In the extreme end where the non-uniformity data is largely or almost purely additive, a very small number (close to '0') is used for the parameter q. For a given value q, the function to apply the non-uniformity estimate to the transformed image can be expressed as:

$$im_{corrected} = f_q(im) - NU \qquad (12)$$

After application of the non-uniformity estimate, the inverse of the transformation is applied to obtain the corrected image in the image domain, which can be expressed as:

$$f_q^{-1}(im_{corrected}) = \frac{e^{im_{corrected} \times \ln(1+q^2)} - 1}{q^2} \qquad (13)$$

In the embodiments where the additive-multiplicative transformation is used during the demixing process, during the step (step 210) of identifying a non-uniformity update candidate, an additional type of update—a global response—may be selected, in addition to the local bump, corner bump, and global diffusion update. The global response type is configured to adjust the parameter q in the transformation function, by applying a polynomial to the current non-uniformity estimate. It could also be interpreted as the other way around, such that the global response type is configured to adapt the non-uniformity to the changes in q in the transformation function. It is noted that apart from the global diffusion, all the other updates to the non-uniformity are local (bumps). Under the global response type, the modification to the transformation function (as illustrated in equation (11)) is a global change to the non-uniformity, and the non-uniformity needs to be adapted to the new transformation equation. Thus, in order to select an improved transformation function under the global response type update, the non-uniformity should also be adapted to the new transformation function.

In some embodiments, the value q in the transformation function (equation (11) above) is also selected to minimize the cost function. This can be performed by a direct-search minimization algorithm, or by testing several q values and identifying a q value in the transformation function that provides a minimal cost based on the cost function determined at step 208. Preferably, more than one q value is tested to identify the q value that produce the least cost based on the cost function. In some embodiments, the optimization of the q value in the transformation function in some embodiments is performed independent of which type of perturbation being used in the update. In each iteration, a type of perturbation (update) is randomly selected, as discussed above, and additionally it is also randomly decided if the q value is also optimized (e.g., selecting a q value that minimizes the cost function).

The perturbation (a hypothetical non-uniformity estimate after applying a global response update to a current non-uniformity estimate) can be obtained by a function expressed as:

$$\Pi(v_{i-1}, c) = c_1 v_{i-1}^2 + c_2 v_{i-1} \qquad (14)$$

where $c_1$ and $c_2$ are parameters for determining how the transformation parameter q is adjusted.

In some embodiments, various combinations of parameters of $c_1$ and $c_2$ may be tested to identify a parameter combination $c_1$ and $c_2$ that minimizes the cost function. Preferably, more than one combination parameters are tested, and even more preferably, a large number of parameter combinations (e.g., 10, 20, 50, 100, 500, etc.) are tested to identify the parameter combination that produces the least cost based on the cost function. The different parameter combinations to be tested may be generated randomly using a randomizer as discussed above, or alternatively, the different parameter combinations to be tested may be generated as a pre-determined ordered sequence within a predetermined range.

As discussed above, the cost function is based on a total variation among pixel values of an image and an energy of the gradient of the non-uniformity estimate. Thus, each tested variation of the parameter combinations may generate a perturbation (hypothetical non-uniformity estimate) using equation (14) by varying the parameters $c_1$ and $c_2$. The cost for each tested parameter combination may then be computed using the generated perturbation (hypothetical non-uniformity estimate) in the cost function, e.g., equation (5). The cost is computed for the different parameter combinations to identify a parameter combination that produces the least cost among the different parameter combinations. The identified parameter combination is then selected for the non-uniformity update candidate. In some embodiments, the cost function, when the additive-multiplicative transformation is applied, is scaled by a derivative of the transformation.

It is noted that processing component 110 may be configured to perform a series of critical image processes to images/video received from imaging sensor 130 in a main signal path before outputting or storing the images/video. As discussed above, one of the advantages of the demixing techniques in accordance to various embodiments disclosed herein is that some of the non-uniformity estimation operations may be performed outside of the main signal path so that this technique can be implemented in devices having limited processing resources. For example, the steps of determining the cost function (step 208), identifying a non-uniformity update candidate (step 210), applying the non-uniformity update candidate to the non-uniformity estimate (step 212), determining whether the non-uniformity update candidate reduce the cost according to the cost function (step 214), updating the non-uniformity estimate with the non-uniformity update candidate (step 218), and resize and rescale the non-uniformity estimate (step 222) may be performed as a background process outside of the main signal path performed by processing component 110 to all images received from imaging sensor 130. In some embodiments, processing component 110 may be configured to select one image out of a number of received images periodically (e.g., every 100 images, every hour, etc.) to perform this non-uniformity estimate generation process in the background. Once signal demixing module 112 has generated a non-uniformity estimate for the selected image, processing component 110 of some embodiments is configured to apply the non-uniformity estimate to all of the received images as part of the main signal path. Thus, for each image received from image sensor 130, processing component 110 may apply the transformation to the image (step 206), apply the non-uniformity estimate to the image (step 224), and apply an inverse of the transformation of the image (step 226) as part of the main signal path.

Figure 7:
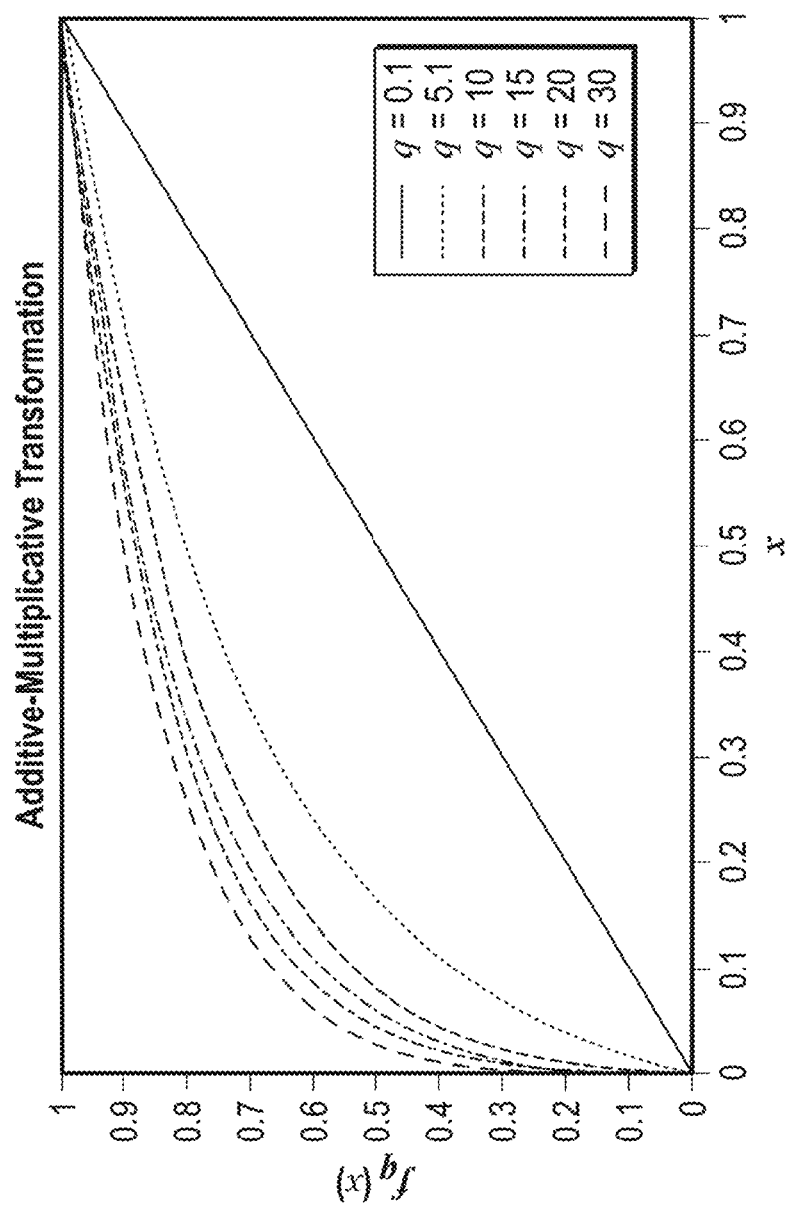
FIG. 7 illustrates a additive-multiplicative transformation using various q values in accordance with an embodiment of the disclosure and several other image enhancement approaches.

FIG. 7 illustrates the relationship between pixel values of a processed image (before applying the additive-multiplicative transformation) and their corresponding transformed pixel values after applying the additive-multiplicative transformation, with different q values.

Figures 11A, 11B:
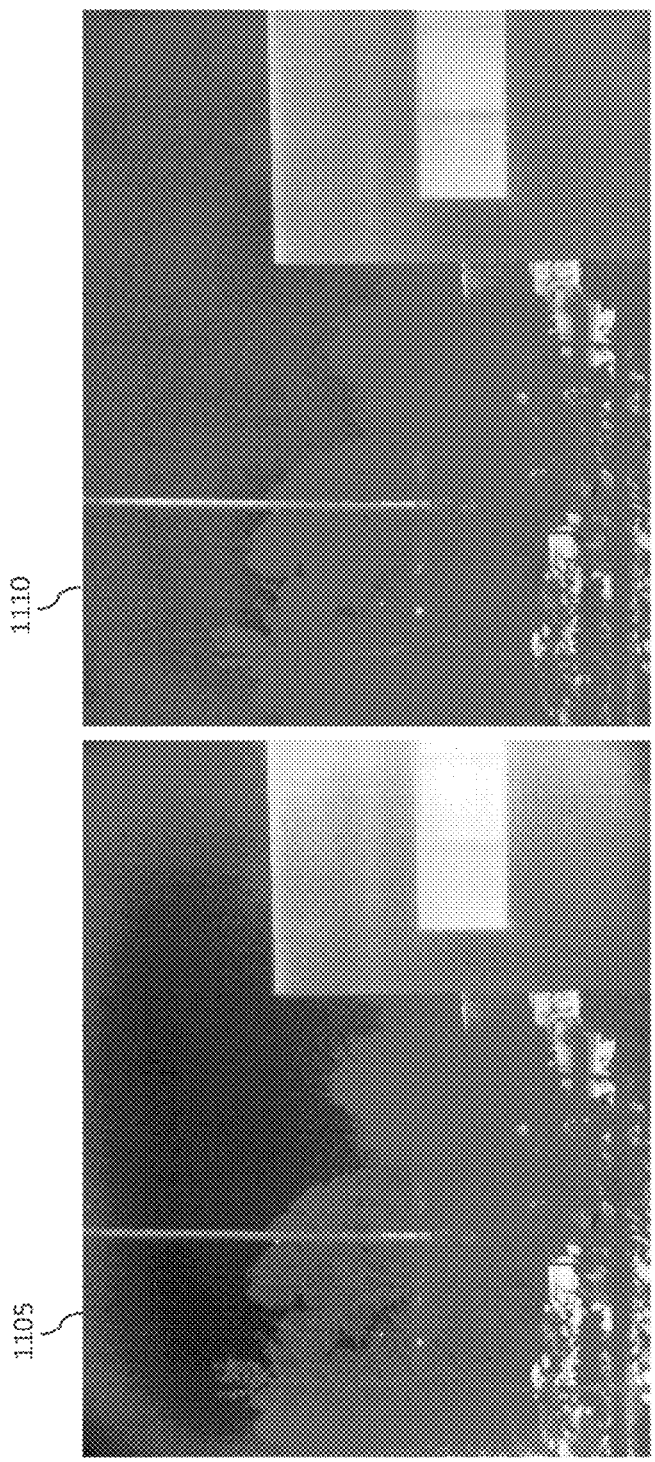
FIGS. 11A and 11B illustrate yet another original image, and a corrected image obtained from applying a signal demixing process in accordance with an embodiment of the disclosure to correct the original image, respectively.

FIG. 10A illustrates another example image 1005 that has been corrupted by non-uniformity data, and FIG. 10B illustrates a corrected image 1010 after a demixing process in accordance with various embodiments disclosed here has been applied to image 1005. FIG. 11A illustrates yet another example image 1105 that has been corrupted by non-uniformity data, and FIG. 11B illustrates a corrected image 1110 after a demixing process in accordance with various embodiments disclosed here has been applied to image 1105.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method of correcting non-uniformity in the form of low frequency shading corrupting an image, the method comprising performing, by a system comprising one or more processing components, operations of:
   generating a non-uniformity estimate for the image by iteratively:
   identifying a new non-uniformity update candidate as one of a set of first functions that minimizes, over the set of first functions, a cost function based on a total variation among pixel values of a processed image which is the image corrected by the first function;
   using the new non-uniformity update candidate to generate the non-uniformity estimate for the current iteration; and
   applying the non-uniformity estimate to the image to obtain a corrected image.

2. The method of claim 1, further comprising:
   resizing the image from an original size to a smaller size before generating the non-uniformity estimate to obtain a resized version of the image, wherein the generating the non-uniformity estimate is performed with respect to the resized version of the image; and
   resizing the generated non-uniformity estimate to the original size before applying the non-uniformity estimate to the image.

3. The method of claim 2, further comprising:
   rescaling pixel values of the resized version of the image from an original scale to a smaller scale before generating the non-uniformity estimate to obtain a resized version of the image; and
   rescaling values of the non-uniformity estimate from the smaller scale to the original scale before applying the non-uniformity estimate to the image.

4. The method of claim 1, further comprising applying, to the image, a transformation applying a logarithmic function to a sum of a constant and a product of a parameter and a value which is an increasing function of the image,
   wherein the generating and the applying of the non-uniformity estimate are performed with respect to the transformed image.

5. The method of claim 4, wherein the transformation comprises a parameter that balances an additive nature of the low frequency shading and a multiplicative nature of the low frequency shading.

6. The method of claim 4, further comprising, after applying the non-uniformity estimate to the transformed image, performing an inverse of the transformation to the corrected image.

7. The method of claim 1, wherein:
   in at least one iteration, using the new non-uniformity update candidate comprises adding the new non-uniformity update candidate to the non-uniformity estimate obtained in a previous iteration; and
   the cost function is further based on an energy level of a gradient of the non-uniformity estimate.

8. The method of claim 7, wherein each iteration comprises selecting a non-uniformity update candidate type for the iteration from a plurality of types, wherein the set of first functions for the iteration depends on the selected type, and each type is selected randomly with an associated priority, and
   the cost function further comprises a weight associated with the total variation among pixel values of the processed image and a weight associated with the energy level of the gradient of the new non-uniformity update candidate.

9. The method of claim 1, wherein using the new non-uniformity update candidate comprises:
   updating the non-uniformity estimate with the new non-uniformity update candidate only when the new non-uniformity update candidate reduces a cost calculated for the non-uniformity estimate based on the cost function; and
   wherein updating the non-uniformity estimate comprises applying a global filter to the non-uniformity estimate.

10. The method of claim 1, wherein using the new non-uniformity update candidate comprises:
    updating the non-uniformity estimate with the new non-uniformity update candidate only when the new non-uniformity update candidate reduces a cost calculated for the non-uniformity estimate based on the cost function; and
    wherein identifying the new non-uniformity update candidate comprises selecting a two-dimensional 2D Gaussian function having a location and a peak amplitude, and wherein updating the non-uniformity estimate comprises adding the 2D Gaussian function to the non-uniformity estimate.

11. The method of claim 10, wherein identifying the new non-uniformity update candidate comprises selecting a spatial location within the image as the location for the 2D Gaussian function.

12. The method of claim 10, wherein identifying the new non-uniformity update candidate comprises selecting a spatial location in or around a corner of the image as the location for the 2D Gaussian function.

13. The method of claim 10, wherein identifying the new non-uniformity update candidate comprises selecting a location and a peak amplitude for the 2D Gaussian function that minimize the cost function.

14. A system for correcting non-uniformity in the form of low-frequency shading corrupting an image, the system comprising:
an image interface configured to receive the image; and
a processor communicatively coupled with the image interface and configured to:
generate a non-uniformity estimate for the image by iteratively:
identifying a new non-uniformity update candidate as one of a set of first functions that minimizes, over the set of first functions, a cost function based on a total variation among pixel values of a processed image which is the image corrected by the first function;
using the new non-uniformity update candidate to generate the non-uniformity estimate by; and
apply the non-uniformity estimate to the image to obtain a corrected image.

15. The system of claim 14, wherein the processor is further configured to apply, to the image, a transformation applying a logarithmic function to a sum of a constant and a product of a parameter and a value which is an increasing function of the image,
wherein the generating and the applying of the non-uniformity estimate are performed with respect to the transformed image.

16. The system of claim 14, wherein:
in at least one iteration, using the new non-uniformity update candidate comprises adding the new non-uniformity update candidate to the non-uniformity estimate obtained in a previous iteration; and
the cost function is further based on an energy level of a gradient of the non-uniformity estimate.

17. The system of claim 16, wherein each iteration comprises selecting a non-uniformity update candidate type for the iteration from a plurality of types, wherein the set of first functions for the iteration depends on the selected type, and each type is selected randomly with an associated priority, and
the cost function further comprises a weight associated with the total variation among pixel values of the processed image and a weight associated with the energy level of the gradient of the new non-uniformity update.

18. The system of claim 14, wherein using the new non-uniformity update candidate comprises:
updating the non-uniformity estimate with the new non-uniformity update candidate only when the new non-uniformity update candidate reduces a cost calculated for the non-uniformity estimate based on the cost function.

19. The system of claim 14, wherein the processor is further configured to:
perform, to images received from the image interface, a series of image processes in a main signal path, wherein the generating of the non-uniformity estimate for the image is performed in a background processing path outside of the main signal path; and
apply the non-uniformity estimate to the images received from the image interface as part of the series of image processes in the main signal path.

20. The system of claim 14, further comprising an infrared imaging sensor configured to capture an infrared image to provide to the image interface, wherein the image comprises the captured infrared image.

* * * * *

UNITED STATES PATENT AND TRADEMARK OFFICE
CERTIFICATE OF CORRECTION

PATENT NO. : 11,100,618 B2
APPLICATION NO. : 16/568139
DATED : August 24, 2021
INVENTOR(S) : Enrique Sanchez-Monge and Alessandro Foi It is certified that error appears in the above-identified patent and that said Letters Patent is hereby corrected as shown below:

In the Specification

In Column 10, Line 65, change "where $\|x\|_1 = \Sigma_{i=1}^{n}|x_i|$      (3)" to --where $\|x\|_1 = \Sigma_{i=1}^{n}|x_i|$      (3)--.

In Column 10, Line 67, change "where $\|x\|_2^2 = \Sigma_{i=1}^{n}|x_i|^2$      (4)" to --where $\|x\|_2^2 = \Sigma_{i=1}^{n}|x_i|^2$      (4)--.

In Column 11, Line 24, change "resealed" to --rescaled--.

In Column 14, Line 26, change "0.2;" to --0.2,--.

In Column 16, Line 60, change "resealed" to --rescaled--.

In Column 16, Line 63, change "resealed" to --rescaled--.

In Column 16, Line 64, change "resealed" to --rescaled--.

In Column 18, Line 42, change "resealed" to --rescaled--.

In Column 18, Line 45, change "resealed" to --rescaled--.

In the Claims

In Claim 3, Column 22, Line 2, change "resealing" to --rescaling--.

In Claim 3, Column 22, Line 6, change "resealing" to --rescaling--.

In Claim 14, Column 23, Line 24, change "the non-uniformity estimate by;" to --the non-uniformity estimate;--.

Signed and Sealed this
Twenty-fourth Day of May, 2022

Katherine Kelly Vidal
*Director of the United States Patent and Trademark Office*